(12) United States Patent
Chevalier

(10) Patent No.: US 6,167,782 B1
(45) Date of Patent: Jan. 2, 2001

(54) ENGINE MODULE LOCATOR BUSHING

(75) Inventor: Steven J. Chevalier, Britton, MI (US)

(73) Assignee: Simpson Industries, Inc., Plymouth, MI (US)

( * ) Notice: Under 35 U.S.C. 154(b), the term of this patent shall be extended for 0 days.

(21) Appl. No.: 09/195,338

(22) Filed: Nov. 18, 1998

Related U.S. Application Data

(60) Provisional application No. 60/067,863, filed on Dec. 8, 1997.

(51) Int. Cl.$^7$ .................................................. F16F 15/10
(52) U.S. Cl. ............................................ 74/574; 74/604
(58) Field of Search ........................... 474/135, 95, 94, 474/174, 166, 190, 191, 192, 170, 902, 903; 464/90, 93, 180, 91, 89, 87; 74/574, 573, 604, 600

(56) References Cited

U.S. PATENT DOCUMENTS

| | | | |
|---|---|---|---|
| 4,034,616 | * 7/1977 | Rausher | 474/174 |
| 4,881,426 | * 11/1989 | Serizawa et al. | 74/574 |
| 4,962,677 | * 10/1990 | Withers | 74/574 |
| 4,977,870 | 12/1990 | Hashimoto . | |
| 5,010,855 | 4/1991 | Ogami . | |
| 5,203,293 | 4/1993 | Shintani . | |
| 5,231,893 | * 8/1993 | Sisco et al. | 74/574 |
| 5,231,961 | * 8/1993 | Shimada et al. | 123/90.27 |
| 5,573,461 | * 11/1996 | Colford | 74/574 X |
| 5,575,728 | * 11/1996 | Cerny | 474/170 |
| 5,692,466 | 12/1997 | Hausmann . | |
| 5,704,329 | 1/1998 | Bublitz . | |
| 5,718,196 | 2/1998 | Uchiyama . | |
| 5,938,169 | 8/1999 | Ogawa . | |

FOREIGN PATENT DOCUMENTS

3842351 * 6/1990 (DE) .

* cited by examiner

*Primary Examiner*—David A. Bucci
*Assistant Examiner*—Marcus Charles

(57) ABSTRACT

A locator bushing member for assembling a damper/pulley member to a crankshaft as part of a modular housing assembly. The locator bushing temporarily secures a damper member to a housing assembly until the housing assembly is secured to the front of a vehicle engine and the damper member is subsequently secured to the nose of the crankshaft. A seal member is typically provided in order to seal the joint between the damper member bushing and housing member. Mating ridge and groove mechanisms, or equivalent mechanisms, can be provided to more securely affix the damper member, locator bushing member and housing member together.

24 Claims, 4 Drawing Sheets

ENGINE MODULE LOCATOR BUSHING

CROSS-REFERENCE TO RELATED APPLICATIONS

This application claims priority to Applicant's co-pending U.S. provisional application Ser. No. 60/067,863, filed Dec. 8, 1997.

TECHNICAL FIELD

The present invention relates to systems and processes for installing torsional dampers and pulleys on engine crankshafts, particularly as part of a modular assembly.

BACKGROUND OF THE INVENTION

There are a number of existing engines, many of which have a damper or isolator member attached to a pulley on the crankshaft to minimize vibration and other noise. Various accessories are also attached to the engines, such as alternators, air compressors, power steering pumps, water pumps, and the like. These accessories are typically assembled on the engines individually, and then operably linked to the pulley and damper member by one or more drive belts.

The damper or isolator member typically has an inner hub (pulley) member and an outer inertia member connected together by an elastomer member. The engine drive belt is connected to the belt track driven by the hub or inertia member and, since the damper member is secured to the crankshaft, is used to power the accessories. In a belt drive system, a tensioner and often an idler pulley, are utilized in order to maintain tension in the belt member.

In order to extend the life of the belt mechanism and drive mechanism, it is important to locate all the engine accessories in such a manner that the path of travel of the belt is all in one plane. In the Applicant's co-pending related patent application directed to a front engine accessory drive system, various engine accessories are secured to a modular housing member and then installed on the front surface of the engine. That application is Ser. No. 09/195,122 and entitled "Integrated Front End Accessory Drive System" (File Simp 0127 PUS). The disclosure of that patent application, which is being filed concurrently with the present application, is incorporated herein by reference.

In the modular system, a damper member is positioned on the housing member along with the various accessories. The damper member, however, is not permanently affixed or secured to the housing member like the other accessories, but only attached to the housing in a temporary manner until it is secured to the crankshaft. Thus, some mechanism is needed to accurately hold and position the damper member precisely in place until the modular housing assembly is secured to the engine.

SUMMARY OF THE INVENTION

These and other objects of the present invention are met by the apparatus and system disclosed herein. In this regard, it is an object of the present invention to provide an improved system and method for mounting engine accessories to an engine. It is also an object of the present invention to provide an improved system and process for assembling engine accessories and a belt drive system on an engine with minimal alignment concerns.

It is a further object of the present invention to provide a modular assembly for mounting on an engine with a modular housing assembly containing the various engine accessories and belt drive system. It is still another object of the present invention to provide a locator bushing member for locating and temporarily securing a damper member in a modular assembly for subsequent assembly to the front of an engine.

These and other objects, purposes and advantages of the present invention, will become apparent from the following summary of the invention, description of the invention, appended claims and drawings.

In accordance with the present invention, a locator bushing member is utilized with the modular housing member. The locator member (a/k/a a locator bushing), includes a cylindrical member, preferably made of a plastic material or the like, which is snap fit or otherwise attached to the modular housing assembly and in turn provides for temporary positioning and holding of the pulley/damper member. The locator member or bushing allows the complete front end modular assembly with attached accessories and belt drive system to be assembled in one piece and then installed on the engine as a subassembly.

When the modular assembly is secured to the engine, the damper/pulley member is bolted or otherwise securely fastened to the crankshaft of the engine.

One or more seals or sealing members can be used in the joints or connections between the locator bushing, pulley/damper member and the modular housing member. Also, preferably, lead tapers or close clearance pilot diameters are provided on the pulley/damper member to aid in the assembly to the crankshaft.

In an alternate embodiment, it is also possible to mount an oil pump to the modular assembly and be interconnected with the locator bushing. The present invention can aid in the mounting of a crankshaft driven oil pump to both a modular assembly and the engine.

The locator member can be made of any material that will withstand the temperatures associated with vehicle engines, and also be sufficiently durable and solvent resistant. In this regard, the material should also be oil and wear resistant, and can further provide a lubricant or have lubricating properties.

DESCRIPTION OF THE PREFERRED EMBODIMENT(S)

Figure 1:
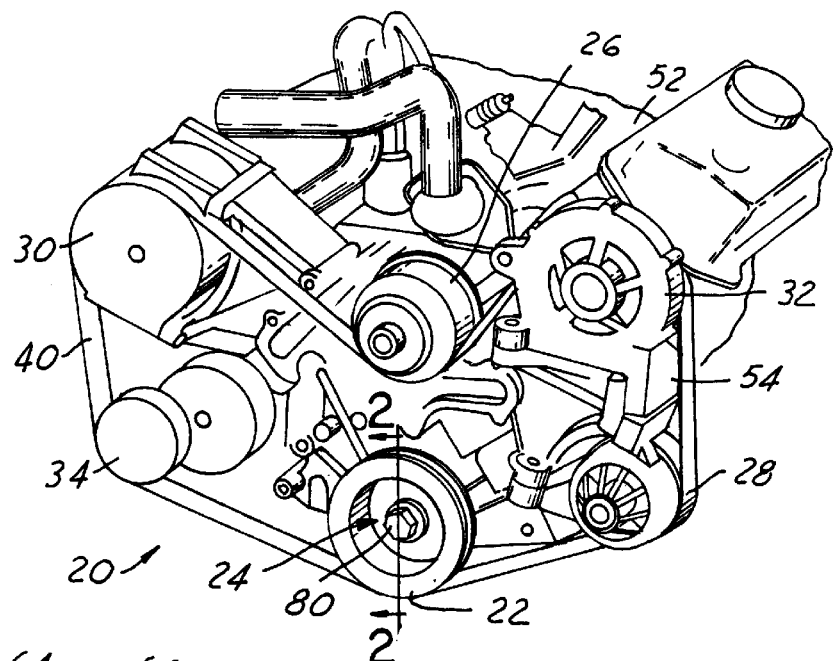
FIG. 1 depicts a vehicle engine utilizing the present invention.

An engine in which the present invention can be used is shown in FIG. 1. The engine is generally referred to by the reference numeral 20. Although a vehicle engine is depicted, it is to be understood that the invention can be utilized with any type of engine, including vehicular, industrial, marine and the like.

The engine 20 has a damper or pulley member 22 connected to the nose 24 of the crankshaft (see FIG. 2) in the engine. The engine 20 also has a number of accessories positioned thereon, such as a water pump 26, a power steering pump 28, an air conditioning compressor 30, an alternator 32, and a belt tensioner 34. The accessories are linked by a belt member 40 which is driven by the pulley 22 connected to the crankshaft. In this regard, as shown in FIG. 1, a vehicle engine is provided which utilizes a single belt for driving all the engine accessories. It is also understood, however, that the present invention can be used with other engine systems in which two or more belt members are utilized.

Figure 3:
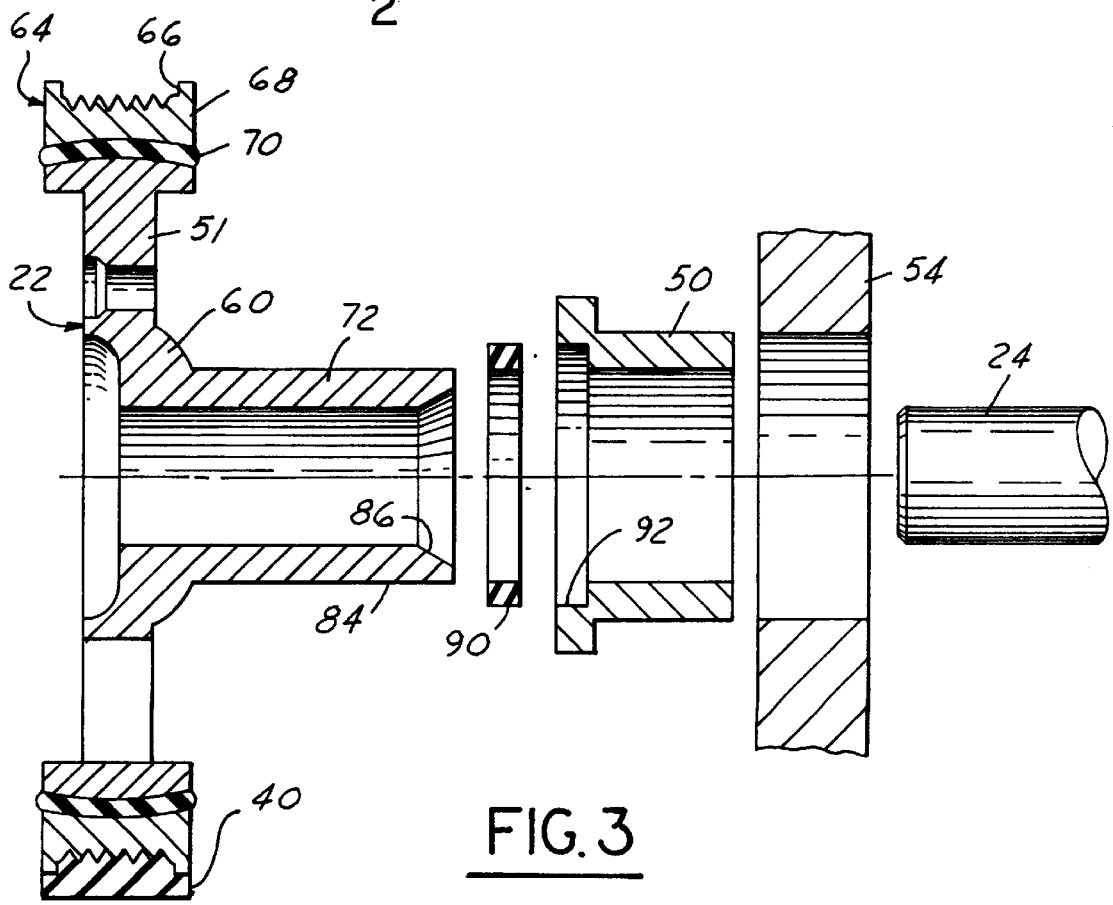
FIG. 3 is an exploded view of the subject matter shown in FIG. 2.
Figure 2:
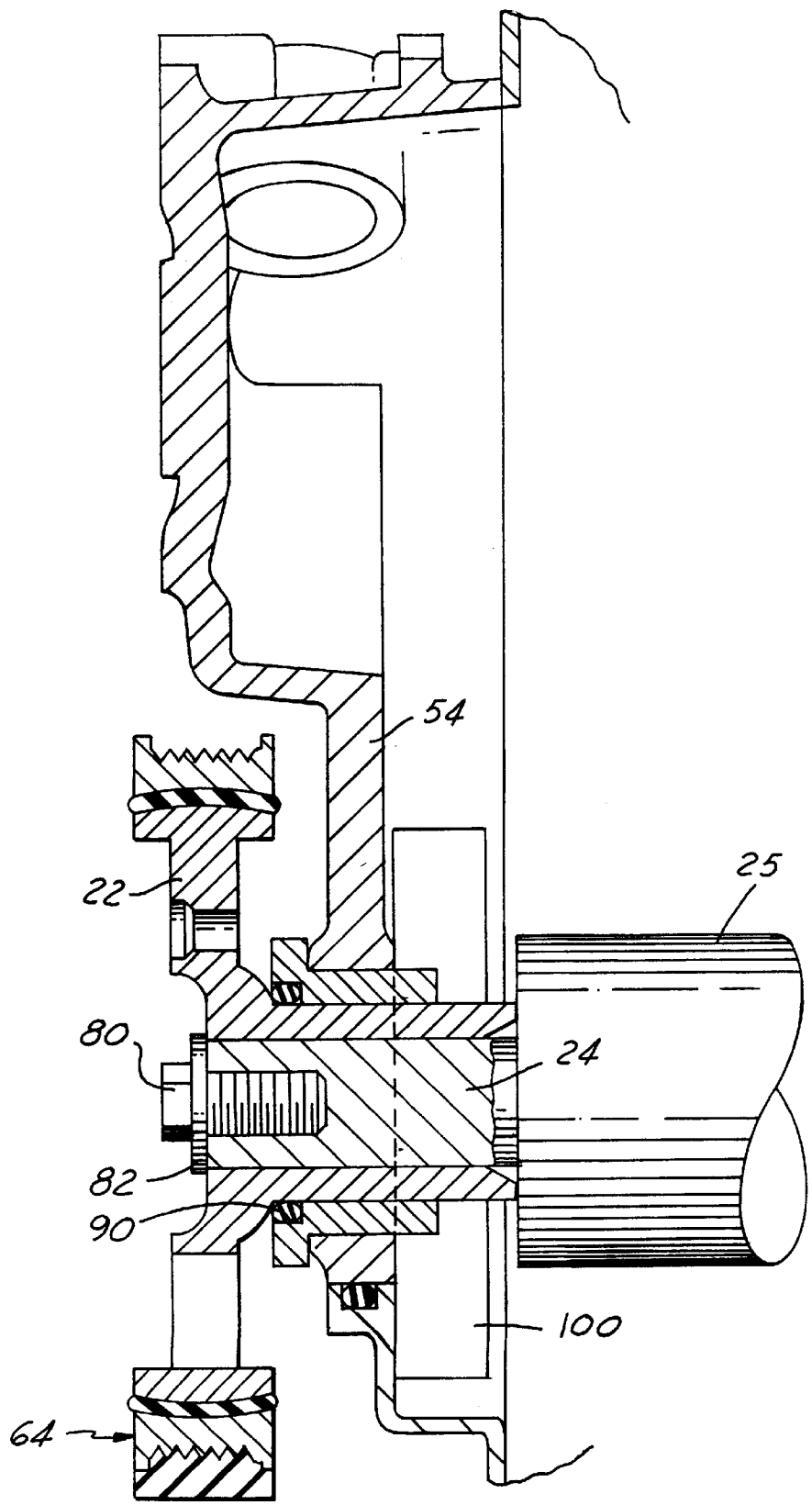
FIG. 2 is a cross-sectional view taken through the pulley/damper of the engine shown in FIG. 1, the cross-section being taken along the line 2—2 in FIG. 1 and in the direction of the arrows.

The present invention utilizes a locator member or bushing 50, as particularly shown in FIGS. 2 and 3. The locator member (or "locator bushing") is used to interconnect the damper/pulley member 22 and the crankshaft 25.

The present invention has particular use relative to the front end modular housing assembly as disclosed in co-pending patent application Ser. No. 09/195,122, entitled "Integrated Front End Accessory Drive System" (File Simp 0127 PUS). The disclosure of that patent application which is being filed on the same day as the present application, is incorporated herein by reference.

In accordance with such co-pending application, many or all of the accessories used with the engine are connected to a modular housing member which is then installed on the front end of the engine block 52. In the drawings herein, the modular housing member is generally referred to by the reference numeral 54. In accordance with the invention, the engine accessories, such as the water pump, power steering pump, air conditioning compressor, tensioner, and damper/pulley, together with the engine belt member, are secured to and aligned on the modular housing member 54 which is then, in turn, securely fastened to the front end of the engine block. In this regard, all of the engine accessories, except for the damper/pulley member, are securely affixed and fastened to the housing member 54. Since the damper/pulley member 22 is adapted to be secured to the nose 24 of the crankshaft 25, it is only "temporarily" secured to the modular housing member 54 until the housing 54 is secured to the engine.

The damper member 22, which also is commonly known as a pulley or isolator member, comprises a hub 60 and an annular belt drive member 64. The belt drive member 64 has an outer inertia member 68 with a belt retaining groove 66. The inertia member 68 is secured to the central portion or hub 60 of the pulley member 22 through an elastomeric member 70. The elastomeric member is also known as a resilient member. Other alternate configurations of damper members (a/k/a isolators) are well-known in the engine field and need not be discussed further here. In general, dampers are installed on an engine to minimize crankshaft vibrations and noise emanating from the engine.

The hub 60 of the damper member 22 has an annular flange 51 and an axial extending member 72 which is adapted to be secured to the nose 24 of the crankshaft 25. In this regard, the damper member 22 is secured to the crankshaft by a suitable fastening mechanism, such as bolt 80, together with washer 82, as shown in FIG. 2. In this manner, when the damper member 22 is installed on the crankshaft, the bolt 80 is assembled and secured in place, thereby securely locking the damper member to the crankshaft. In this regard, it is preferred to have the end 84 of the axial extending member 72 which is adapted to be mounted on the nose 24 of the crankshaft 25 have an inner tapered entry surface 86. This provides easier alignment and positioning of the damper member on the crankshaft during assembly.

The locator bushing provides a means for holding the crankshaft damper, pulley or isolator member in place so that the front end accessory drive mechanism can be mounted as a modular or preassembled subassembly to an engine. The locator bushing preferably has a crankshaft seal 90 associated therewith. For example, in the embodiment shown in FIGS. 2 and 3, the seal 90 is positioned in a groove 92 in the locator bushing 50. The seal prevents oil and other fluids from passing or leaking through to the front of the engine, particularly through the joint between the damper 22 and housing member 54. It is also to be understood that various other sealing members and mechanisms could be utilized to prevent leakage of engine fluids through the damper member.

The locator bushing or member can also serve as an alignment bushing for a gerotor or other type of oil pump. Such an oil pump is shown schematically by the reference numeral 100 in FIG. 2. For this purpose, the locator bushing can be designed to orient the drive mechanism and hold it in proper alignment, as well as to aid in the assembly of the housing modular subassembly.

By utilizing the present invention, the front end accessory drive modular assembly can be fully assembled, including installation of the belt member, in the modular subassembly prior to being affixed to the front of the engine. The modular subassembly could also be fine tuned for alignment reasons prior to being installed on the engine. This would allow for installation of the entire front end of an engine and belt system without alignment concerns with reduced tolerance stack-ups. It would allow for modular assembly in which all of the accessories and damper are aligned within improved tolerances such that the path of travel of the belt member is in a single plane.

The locator member or bushing could be made of any material, but preferably is made from a material which is resistant to oil, heat, and wear. Preferred materials would be in the plastics family, such as nylon or another comparable material. As indicated, the material should be resistant to oil or other fluids which are commonly used in a vehicle environment, and also be resistant to the temperatures that are normally associated with the lubricants, other fluids and components of the vehicle engine. Similarly, since the bushing remains between the damper member and the modular housing assembly during subsequent use of the engine, it should be sufficiently durable to not degrade or breakdown during the life of the engine.

Figure 4:
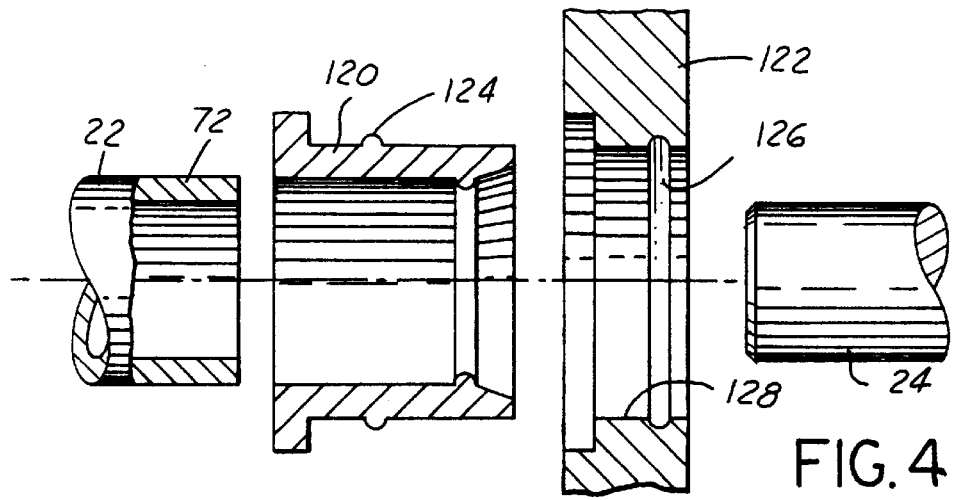
FIGS. 4–10 illustrate alternate embodiments of locator member/bushings in accordance with the present invention.

Other alternate embodiments for the locator bushing member are shown in FIGS. 4–10. For example, in FIG. 4, a fastening mechanism is provided which more securely holds the locator bushing in the housing assembly prior to the time that the modular assembly is secured to the front of the engine and the damper member is secured to the nose of the crankshaft. In FIG. 4, the axial extending member 72 of the hub 60 of the damper member 22 is positioned in the locator bushing 120 which in turn is adapted to be located within the modular housing member 122. The nose 24 of the crankshaft is also shown in FIG. 4. In order to more securely hold the locator bushing 120 to the housing assembly 122, a mating ridge and groove mechanism is utilized. The ridge and groove mechanism consists of a ridge 124 positioned on the external surface of the locator bushing 120 and a corresponding groove 126 provided in the internal surface of the opening 128 in the modular housing member 122.

Figure 5:
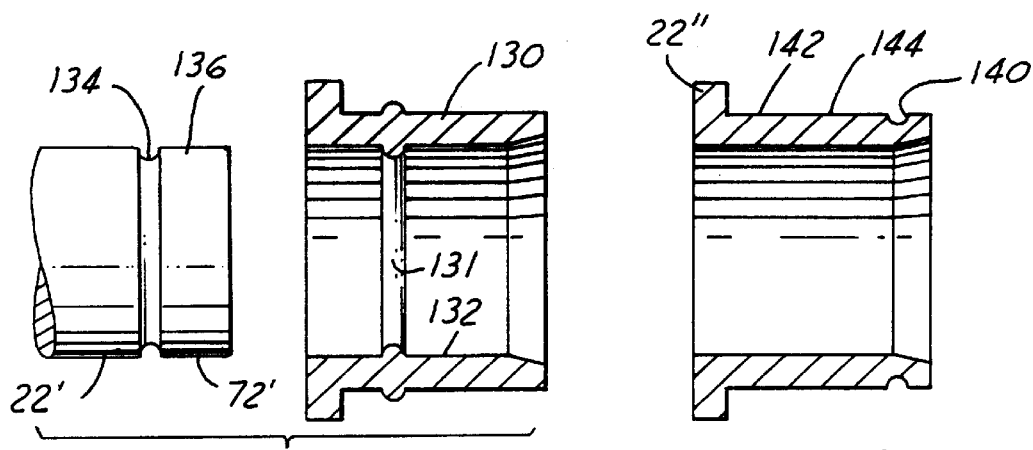

In FIG. 5, a second ridge and groove mechanism is utilized to more securely hold the locator bushing 130 to the axial extending member 72' of the damper 22'. In this instance, a second ridge 131 is formed on the interior surface 132 of the locator bushing while a groove 134 is provided on the external surface 136 of the member 72'.

Figure 6:
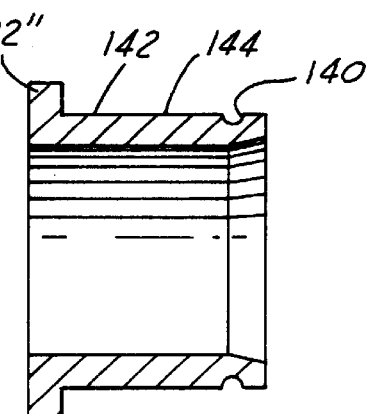
Figure 7:
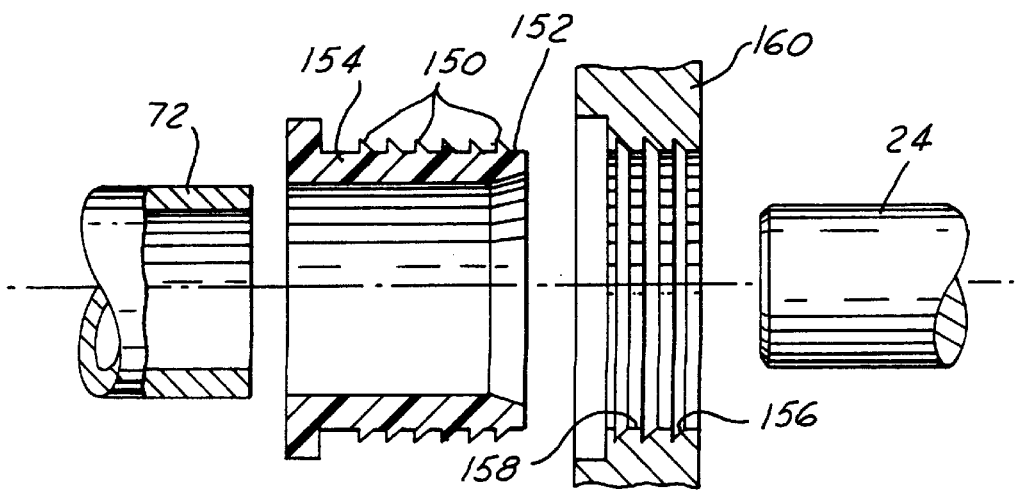

Similarly, as shown in FIG. 6, the ridge and groove mechanism shown in FIG. 4 could be formed in such a manner that a groove 140 is provided on the external surface 142 of the axial extending member 144 of the damper member 22'. A mating ridge member in turn (not shown) is provided in the internal surface of the opening in the modular housing member.

Figure 8:
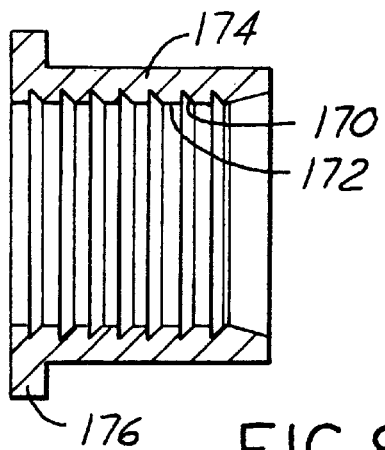
Figure 9:
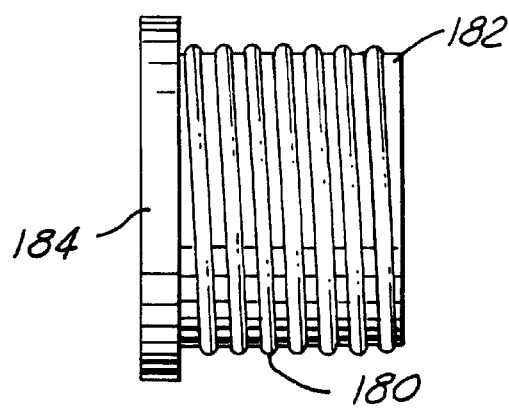
Figure 10:
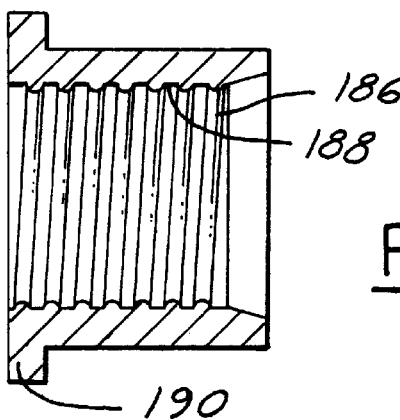

Other mechanisms for more securely holding the locator bushing in the opening in a modular housing assembly, or for more securely holding the hub of the damper member on the locator bushing, are shown in FIGS. 7–10. For example, in FIG. 7, a plurality of raised flanges or ridges 150 are provided on the exterior surface 152 of the locator bushing 154. Similarly, a corresponding plurality of mating grooves 156 are provided in the internal surface 158 of the housing member 160. In FIG. 8, a series of similar grooves 170 are provided on the interior surface 172 of the axial extending member 174 of the hub of locator bushing 176. A corresponding series of mating ridges (not shown) would also be provided on the exterior surface of the hub of the damper member in order to mate with grooves 170.

In the same manner, rather than providing a series of annular grooves and ridges, one or more series of spiral or helical ridges can be provided on the interior and exterior surfaces of the mating members. For example, in FIG. 9, a raised spiral ridge 180 is provided on the exterior surface 182 of locator bushing 184. And, in FIG. 10, a circular raised ridge 186 is provided on the interior surface 188 of locator bushing 190. Modular housing assemblies and damper hub members would be provided with mating grooves corresponding to the spiral ridges 180 and 186 in order to securely hold the components together.

As would be understood by persons of ordinary skill in the art, it may not be necessary to provide mating grooves and ridges in either or both of the corresponding surfaces. For example, one or more annular ridges or spiral ridges could be provided in the damper hub, locator bushing, and/or housing assembly and the three members could then be force fit or mated together without the necessity of providing mating corresponding grooves in the opposite or mated member. Also, it is understood that other types of mechanisms could be used to more securely affix the locator bushing to the modular housing member, as would be obvious to persons or ordinary skill in the art. Thus, the mating ridge and groove configurations discussed above, are merely exemplary and are not to be taken as being the only or exclusive mechanism for temporarily holding the three members together during assembly of the modular housing and accessories to an engine.

Moreover, the present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed is:

1. A vehicle engine assembly comprising:
an engine;
a modular housing member assembled on an attachment surface of said engine;
a plurality of engine accessories secured to said housing member;
a belt member attached to said plurality of engine accessories for driving said engine accessories;
a damper member attached to said housing member; and
a locator bushing member positioned between said damper member and said housing member;
wherein said locator bushing member secures said damper member to said housing member until said housing member is secured to said engine.

2. The engine assembly according to claim 1 wherein said locator bushing member comprises a cylindrical body member having a first end portion and a second end portion, and an annular flange member on said first end portion.

3. The engine assembly according to claim 1 wherein said locator bushing member is secured to said damper member by ridge and groove means.

4. The engine assembly according to claim 1 wherein said locator bushing member is secured to said housing member by ridge and groove means.

5. The engine assembly according to claim 1 further comprising a seal member for sealing said locator bushing member to said damper member.

6. The engine assembly according to claim 5 wherein said seal member is positioned in a groove in said locator bushing member.

7. A vehicle engine assembly comprising:
an engine having an attachment surface;
a modular housing secured to said attachment surface of said engine;
a plurality of engine accessories secured to said modular housing;
a belt member attached to said plurality of engine accessories for driving said engine accessories;
a damper member being engageable with an engine crankshaft to allow rotation thereof, said damper member having a neck portion that passes through a passage formed in said modular housing;
a locator bushing which is separate and discrete from said modular housing disposed in said passage between said modular housing and said neck portion of said damper member; and
wherein said locator bushing secures said damper member to said modular housing until said modular housing is secured to said engine.

8. The engine assembly according to claim 7, wherein said locator bushing comprises a cylindrical body member having a first end portion and a second end portion and an annular flange member on said first end portion.

9. The engine assembly according to claim 8, wherein an annular groove is formed in said annular flange for receipt of a seal therein, whereby fluid communication between said engine and said damper member is prevented.

10. The engine assembly according to claim 7, wherein said locator bushing is constructed of an oil resistant material.

11. The engine assembly according to claim 7, wherein said locator bushing is constructed of a polymer.

12. The engine assembly according to claim 7, wherein said locator bushing is secured to said damper member by ridge and groove means.

13. The engine assembly according to claim 7, wherein said locator bushing is secured to said housing member by ridge and groove means.

14. A locator bushing for use in aligning a driven mechanism with respect to a modular housing, the bushing comprising:
a generally cylindrical body having an inner periphery and an outer periphery, said inner periphery forming a passage for contacting the driven mechanism, which is driven by a drive shaft and said outer periphery in contact with the modular housing; and an annular flange portion attached to an end of said generally cylindrical body, said annular flange having an outer periphery diameter that is larger than said outer periphery diameter of said generally cylindrical body such that an underside of said annular flange contacts a surface of the modular housing; and wherein said annular flange includes an annular groove for receipt of a sealing mechanism.

15. The locator bushing according to claim 14, wherein said drive mechanism is an oil pump.

16. The locator bushing according to claim 14, wherein said drive mechanism is a crankshaft damper hub.

17. The locator bushing according to claim 16, wherein the bushing is constructed of an oil and heat resistant material.

18. The locator bushing according to claim 17, wherein the bushing is constructed of a polymer material.

19. The locator bushing according to claim 14, wherein said annular flange includes an annular groove for receipt of a sealing mechanism.

20. The locator bushing according to claim 19, wherein said fastening mechanism includes an annular ridge formed on said outer periphery of said body portion, said annular ridge being matingly engageable with a groove formed in said modular housing passage.

21. The locator bushing according to claim 20, wherein said fastening mechanism further includes an annular ridge that is formed on said inner periphery of said body portion, said annular ridge being matingly engageable with a groove formed on the driven mechanism.

22. The locator bushing according to claim 19, wherein said fastening mechanism includes an annular groove formed on said outer periphery of said body portion for mating with a corresponding ridge formed in said modular housing passage.

23. The locator bushing according to claim 19, wherein said fastening mechanism includes a plurality of raised ridges provided on said outer periphery of said body portion for engaging corresponding grooves formed in said modular housing passage.

24. The locator bushing according to claim 19, wherein said fastening mechanism includes a helical ridge formed on said outer periphery of said body portion.

* * * * *